(12) United States Patent
Ochiai et al.

(10) Patent No.: US 9,906,750 B2
(45) Date of Patent: Feb. 27, 2018

(54) IMAGE PICKUP DEVICE DRIVING METHOD, IMAGE PICKUP DEVICE, AND IMAGE PICKUP SYSTEM USING RESET CANCELLATION

(71) Applicant: CANON KABUSHIKI KAISHA, Tokyo (JP)

(72) Inventors: Kei Ochiai, Inagi (JP); Hideo Kobayashi, Tokyo (JP); Kazuo Yamazaki, Yokohama (JP); Yasuhiro Oguro, Tokyo (JP); Masaki Sato, Yokohama (JP); Mineo Uchida, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/372,185

(22) Filed: Dec. 7, 2016

(65) Prior Publication Data

US 2017/0171486 A1    Jun. 15, 2017

(30) Foreign Application Priority Data

Dec. 11, 2015 (JP) .................................. 2015-242314

(51) Int. Cl.
*H04N 5/378* (2011.01)
*H04N 5/376* (2011.01)
*H04N 5/374* (2011.01)
*H04N 5/3745* (2011.01)

(52) U.S. Cl.
CPC ........... *H04N 5/378* (2013.01); *H04N 5/3765* (2013.01); *H04N 5/37455* (2013.01)

(58) Field of Classification Search
CPC ........ H04N 5/378; H04N 5/3765; H03M 1/00

USPC .......................................................... 348/308
See application file for complete search history.

(56) References Cited

U.S. PATENT DOCUMENTS

| | | | | |
|---|---|---|---|---|
| 9,521,337 | B1* | 12/2016 | Shen | H04N 5/3355 |
| 2006/0011810 | A1* | 1/2006 | Ando | H04N 5/374 250/208.1 |
| 2009/0053848 | A1* | 2/2009 | Fan | H01L 27/14603 438/59 |
| 2013/0110444 | A1* | 5/2013 | Pahr | H04N 5/3742 702/116 |
| 2014/0168489 | A1* | 6/2014 | Mishina | H04N 5/3742 348/300 |
| 2015/0296163 | A1* | 10/2015 | Nakamura | H04N 5/378 348/308 |
| 2015/0373290 | A1* | 12/2015 | Vogelsang | H04N 5/378 348/302 |
| 2015/0373291 | A1* | 12/2015 | Oh | H04N 5/37452 348/324 |

FOREIGN PATENT DOCUMENTS

JP    2010-219958 A    9/2010

* cited by examiner

*Primary Examiner* — Nhan T Tran
(74) *Attorney, Agent, or Firm* — Canon USA, Inc., IP Division (57) ABSTRACT

A photoelectric convertor of a pixel is reset in a second row, which is different from a first row, among plural rows during a period in which the pixel in the first row among the plural rows is being selected as a pixel to output an optical signal. The reset of the photoelectric convertor of the pixel in the second row is canceled in a period other than a period in which an A/D converting unit converts the optical signal of the pixel in the first row into a digital signal.

18 Claims, 9 Drawing Sheets

IMAGE PICKUP DEVICE DRIVING METHOD, IMAGE PICKUP DEVICE, AND IMAGE PICKUP SYSTEM USING RESET CANCELLATION

BACKGROUND OF THE INVENTION

Field of the Invention

One disclosed aspect of the embodiments relates to an image pickup device driving method, an image pickup device, and an image pickup system.

Description of the Related Art

There is a known image pickup device in which a plurality of pixels are arranged in plural rows and plural columns. Hereinafter, a row on which the pixels are arranged is referred to as a pixel row and a column on which the pixels are arranged is referred to as a pixel column.

Japanese Patent Laid-Open No. 2010-219958 discloses a configuration in which a pixel includes a photoelectric convertor, a transfer transistor, an amplification transistor having an input node, and a reset transistor. The transfer transistor transfers a charge accumulated in the photoelectric convertor to the input node. The reset transistor resets the charge of the input node. The image pickup device in which the pixels are arranged in plural rows and plural columns is described. Then, it is described to perform a shutter scan that scans the reset of the photoelectric convertor per pixel row and a read out scan that scans a transfer of the charge accumulated in the photoelectric convertor by the transfer transistor per pixel row. In the shutter scan, when the reset transistor and transfer transistor are both turned on, the charge of the photoelectric convertor is reset.

SUMMARY OF THE INVENTION

One aspect of the embodiments is made in view of a later described problem and one aspect is a driving method of an image pickup device that includes a plurality of pixels configured to be arranged in plural rows and plural columns, respectively include a photoelectric convertor for generating charge, and respectively output an optical signal based on the charge, and a plurality of analog-to-digital (A/D) converting units configured to be respectively provided corresponding to the plural columns and convert the optical signal to a digital signal. The driving method includes resetting the photoelectric convertor of the pixel in a second row, which is different from a first row, among the plural rows during a period in which the pixel in the first row among the plural rows is being selected as a pixel to output the optical signal, and canceling the reset of the photoelectric convertor of the pixel in the second row in a period other than the period in which the A/D converting unit converts the optical signal of the pixel in the first row into the digital signal.

Further features of the disclosure will become apparent from the following description of exemplary embodiments (with reference to the attached drawings).

DESCRIPTION OF THE EMBODIMENTS

A change in a potential of a transfer control line that controls a reset of the photodiode may change a potential of the transfer control line of a pixel from which a signal is read out. Further, in the shutter scan of one pixel row, the timing when the reset of the photodiode is canceled and the timing when a signal of the pixel in another row is read out may match. In this case, the change of the potential of the transfer control line for controlling the reset of the photodiode causes a change in signals of the pixel in another row, which is being read.

With this, there may be a problem that, due to a cancellation of a reset of a photodiode in one row, a change is caused in a signal being read out from a pixel in another row.

Embodiments described in the following relates to a technique that reduces the change in the signal being read out from the pixel in one row due to the cancellation of the reset of the photodiode in a different row.

Hereinafter, embodiments will be explained with reference to the drawings.

First Embodiment

A configuration of an image pickup device 100 according to a first embodiment will be described with reference to FIG. 1.

The image pickup device 100 is representatively a CMOS image sensor. The image pickup device 100 photoelectrically converts incident light representative of an image of an object, and outputs an electric signal acquired by the photoelectric conversion, as a digital data, to outside. The image pickup device 100 has a pixel array 110 including a plurality of pixels 111 which are arranged in a plurality of rows and a plurality of columns. In the following, a column of the pixels 111 is referred to as a pixel column and a row of the pixels 111 is referred to as a pixel row. Each of the plurality of pixels 111 generates charge by photoelectrically converting an incident light. According to the present embodiment, in purpose of simplification, the pixels are simply illustrated in four rows and four columns, however, the pixels may be arranged in more rows and columns. The pixel array 110 typically includes tens of millions of pixels 111.

The image pickup device 100 further includes a vertical scan circuit 140. The vertical scan circuit 140 supplies drive pulse signals to pixel control lines 112 provided to each pixel row respectively, for each pixel row sequentially. When the drive pulse signals are supplied to the pixel control line 112, each pixel 111 included in the corresponding pixel row outputs a signal corresponding to photoelectrically converted charge as a voltage signal to vertical output lines 113. According to the present embodiment, the pixels 111 respectively output, to the vertical output lines 113, a noise signal, which is a reset level signal of the pixel 111, and an optical signal, which is a signal corresponding to the charge generated by photoelectric conversion with the noise signal superimposed thereon. Here, in the following, when the noise signal and optical signal output from the pixel 111 are expressed together, they may be referred to as a pixel signal.

To the vertical output line 113, a current source 125 is connected.

The image pickup device 100 further includes an amplifying circuit 120 that amplifies the optical signal input from the pixels 111 via the vertical output line 113 and provides the signal to the A/D converting unit 130.

The image pickup device 100 further includes ramp signal supply units 170 and counters 180. The ramp signal supply unit 170 provides a ramp signal Vramp to each A/D converting unit 130 via ramp signal lines 171. The ramp signal Vramp is a signal having a potential that monotonously changes according to elapse of the time. The counter 180 provides a count value Cnt to each A/D converting unit 130 via count data lines 181.

The image pickup device 100 further includes horizontal scan circuits 150 and signal processing units 190. The horizontal scan circuit 150 transfers the digital data output from the A/D converting unit 130 of each column to digital signal lines 191 and 192. The digital data transferred to the digital signal lines 191 and 192 is supplied to the signal processing units 190. According to the present embodiment, digital data corresponding to the noise signal and digital data corresponding to the optical signal are sequentially output to the digital signal lines 191 and 192 respectively. The signal processing unit 190 performs a CDS process for subtracting digital data corresponding to the noise signal from the digital data corresponding to the optical signal. With this process, the signal processing unit 190 obtains digital data in which a noise element is reduced from the digital data corresponding to the optical signal. The signal processing unit 190 outputs the digital data from which the noise element is reduced to the outside of the image pickup device 100.

The image pickup device 100 further includes a timing control unit 195 that controls operation of the image pickup device 100 by providing pulse signals to each of the above described components.

Figure 2:
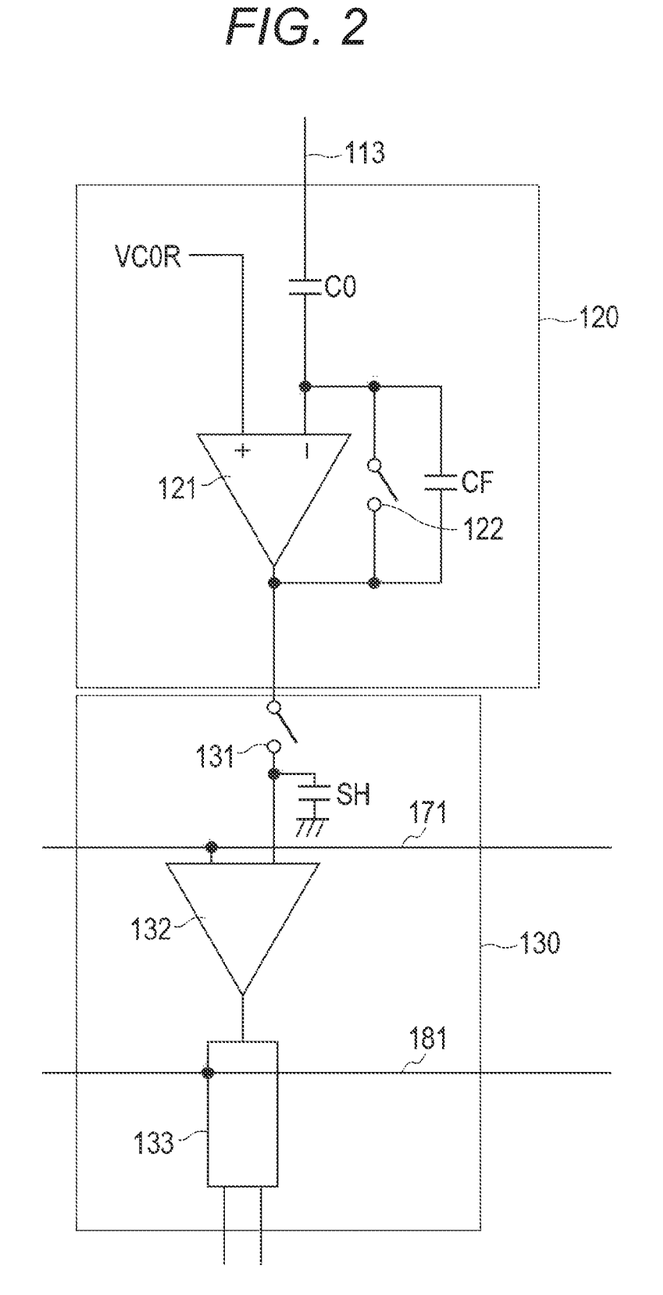
FIG. 2 is a diagram illustrating configurations of an amplifying circuit and an A/D converting unit.

FIG. 2 is a diagram illustrating detailed configurations of the amplifying circuit 120 and the A/D converting unit 130. The amplifying circuit 120 includes an operation amplifier 121, a capacitive element C0, a capacitive element CF, and a switch 122. The vertical output line 113 is connected to an inverting input node of the operation amplifier 121 via the capacitive element C0. The inverting input node of the operation amplifier 121 is further connected to one node of the capacitive element CF and one node of the switch 122. The other node of the capacitive element CF and the other node of the switch 122 are connected to an output node of the operation amplifier 121. To a non-inverting input node of the operation amplifier 121, a voltage VC0R is input. The amplifying circuit 120 outputs a signal that is the signal input from the vertical output line 113 to the inverting input node via the capacitive element C0 amplified with a ratio of (a capacitance value of the capacitive element C0/a capacitance value of the capacitive element CF).

The A/D converting unit 130 includes a switch 131, a capacitive element SH, a comparator 132, and a memory 133. The switch 131 is provided in an electrical path between an output node of the amplifying circuit 120 and the capacitive element SH. The switch 131 and capacitive element SH compose a sample-and-hold circuit.

The capacitive element SH is connected to one input node of the comparator 132. Further, to the other input node of the comparator 132, the ramp signal line 171, which transmits a ramp signal ramp, is connected. The switch 131 is controlled by a signal PSH output from the timing control unit 195 illustrated in FIG. 1 and is turned on and off.

An output node of the comparator 132 is connected to the memory 133. Further, to the memory 133, the count data line 181 is connected. With the horizontal scan by the horizontal scan circuit 150 illustrated in FIG. 1, the memory 133 outputs digital data to the signal processing unit 190.

Figure 3:
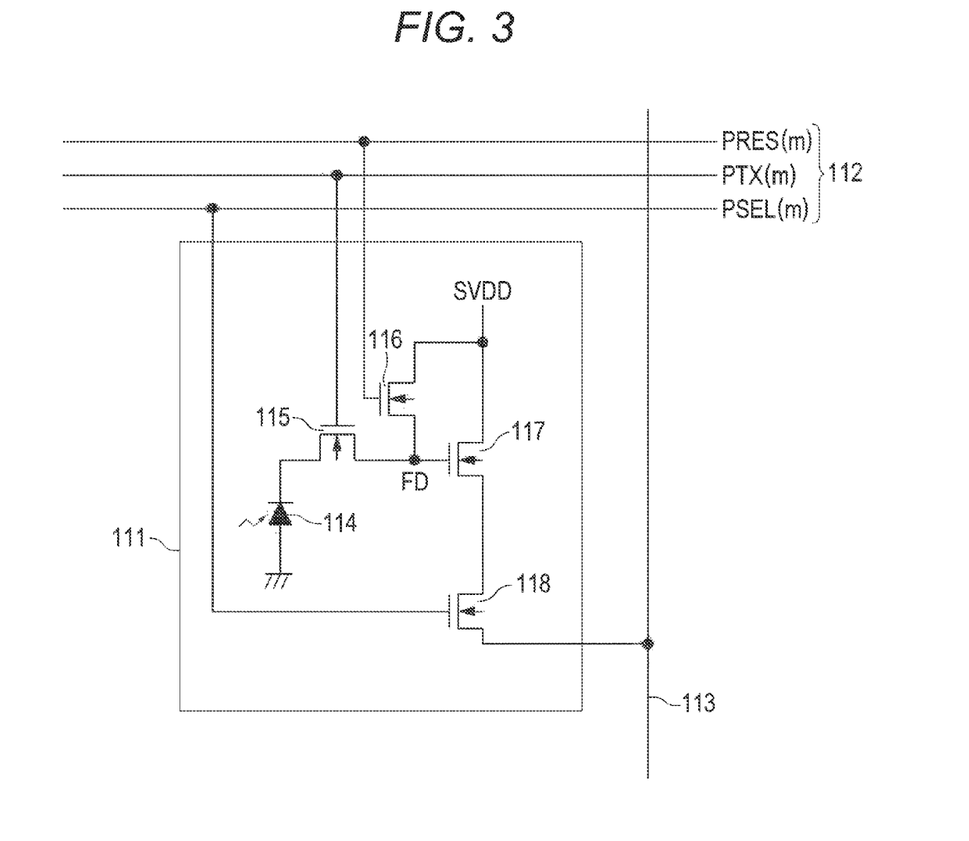
FIG. 3 is a diagram illustrating an example of a configuration of a pixel.

FIG. 3 is a diagram illustrating a configuration of the pixel 111. The pixel 111 illustrated in FIG. 3 is one of the pixels 111 in the four rows and four columns in the pixel array 110 illustrated in FIG. 1.

The pixel 111 includes a photodiode 114, which performs photoelectric conversion, and a plurality of transistors. The photodiode 114 is a photoelectric conversion unit that receives an incident light and generates charge. The photodiode 114 is connected to an input node FD of an amplification transistor 117 via a transfer transistor 115. The input node FD is also connected to a power source SVDD via a reset transistor 116. A first main electrode of the amplification transistor 117 is connected to the power source SVDD and a second main electrode of the amplification transistor 117 is connected to the vertical output line 113 via a selection transistor 118. A gate electrode of the selection transistor 118 is connected to a row selection line, which is one of the pixel control lines 112. The row selection line transmits a signal PSEL. A gate electrode of the reset transistor 116 is connected to a reset line, which is one of the pixel control lines 112. The reset line transmits a signal PRES. Further, a gate electrode of the transfer transistor 115 is connected to a transfer line, which is one of row control lines. The transfer line transmits a signal PTX. The vertical scan circuit 140 is a control unit that controls operation of the pixel 111.

When the signal PSEL becomes a high level, to the amplification transistor 117, current is applied by the current source 125 via the vertical output line 113 and selection transistor 118. The period that the current flows to the amplification transistor 117 is a period that a signal is read out from the pixel 111 to the vertical output line 113.

Here, the signal PRES, signal PTX, signal PSEL may be expressed with (m) attached. This represents that the signal is output from the vertical scan circuit 140 to the pixel 111 in "m"th row.

Figure 4:
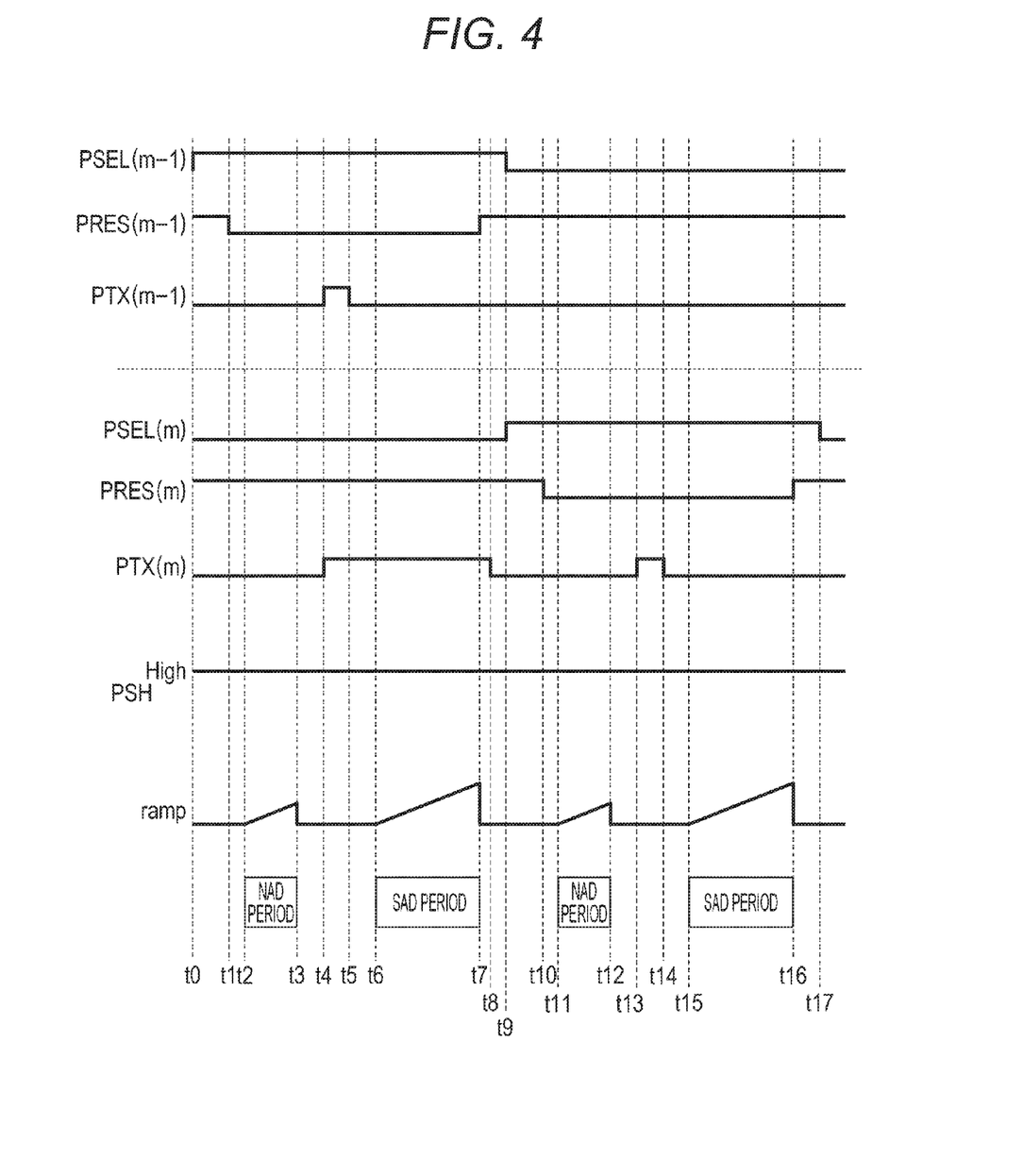
FIG. 4 is a diagram illustrating an example of an operation of the image pickup device.

FIG. 4 is a timing diagram illustrating an operation in the image pickup device according to the present embodiment.

FIG. 4 is a diagram illustrating signals, which are output from the vertical scan circuit 140 to the respective pixels 111 in "m−1"th raw as a first line and pixels 111 in "m"th row as a second row, the signals PSH, and a ramp signal ramp.

At time t0, the vertical scan circuit 140 sets the signal PSEL(m−1) High. With this, by the current source 125, current is flown to the amplification transistor 117 of the pixel 111 in the "m−1"th row via the vertical output line 113 and the selection transistor 118 in the "m−1"th row. Accordingly, the amplification transistor 117, power source voltage SVDD, and current source 125 compose a source follower circuit. Further, the vertical scan circuit 140 sets the signal PRES(m−1) High. With this, the potential of the input node FD of the pixel 111 in the "m−1"th row is reset. The period that the signal PSEL(m−1) is High from time t0 to time t9 is a period that the pixels 111 in the "m−1"th row as the first row are selected as the pixels 111 of the pixel row to which an optical signal is output in the read out scan.

At time t1, the vertical scan circuit 140 sets the signal PRES(m−1) Low. With this, the reset of the input node FD is canceled. With this configuration, the amplification transistor 117 of the pixel 111 in the "m−1"th row outputs a noise signal to the vertical output line 113 via the selection transistor 118.

At the timing when the noise signal is output, the timing control unit 195 turns off the switch 122. Accordingly, the noise signal is clamped in the capacitive element C0.

To the comparator 132, an offset signal of the operation amplifier 121 is input.

At time t2, the ramp signal supply unit 170 starts the change of potential of the ramp signal ramp according to the elapse of time. Further, the counter 180 starts to count clock signals. With this, the count signal output from the counter 180 increases its signal value according to the elapse of time. When the magnitude relationship between the potentials of the offset signal and ramp signal ramp changes, the signal level of the comparison result signal output from the comparator 132 changes. The memory 133 maintains a count signal at the timing when the signal level of the comparison result signal changes. The count signal maintained by the memory 133 is a digital signal corresponding to the offset signal. This digital signal will be referred to as a digital N signal.

At time t3, the ramp signal supply unit 170 ends the change of the potential of the ramp signal according to the elapse of time. Further, the counter 180 also ends counting the clock signals.

The period that the potential of the ramp signal ramp changes from time t2 to time t3 is a period of AD conversion of the offset signals. This AD conversion period may be referred to as an NAD period.

At time t4, the vertical scan circuit 140 sets the signal PTX(m−1) High. This turns on the transfer transistor 115. Accordingly, the charge generated by the photodiode 114 of the pixel 111 in the "m−1"th row is transferred to the input node FD.

At time t5, the vertical scan circuit 140 sets the signal PTX(m−1) Low. This turns off the transfer transistor 115. Accordingly, the transfer of the charge generated by the photodiode 114 to the input node FD ends. The amplification transistor 117 outputs a signal based on the charge generated by the photodiode 114 to the vertical output line 113 via the selection transistor 118. This signal will be referred to as an optical signal.

The capacitive element C0 continuously clamps the noise signals. Thus, to the operation amplifier 121, a signal in which a noise signal is subtracted from an optical signal is input. This signal will be referred to as an S signal.

The operation amplifier 121 outputs, to the comparator 132, a signal that the S signal is amplified. This signal will be referred to as an amplified S signal.

At time t6, the ramp signal supply unit 170 starts to change the potential of the ramp signals ramp according to the elapse of time. Further, the counter 180 starts to count the clock signals. With this, the signal value of the count signal output from the counter 180 increases according to the elapse of time. When the magnitude relationship between the potentials of the amplified S signal and ramp signal ramp changes, the signal level of the comparison result signal output from the comparator 132 changes. The memory 133 maintains the count signal at the timing when the signal level of the comparison result signal changes. The count signal maintained by the memory 133 is a digital signal corresponding to the amplified S signal. This digital signal will be referred to as a digital S+N signal.

At time t7, the ramp signal supply unit 170 ends changing the potential of the ramp signal according to the elapse of time. Further, the counter 180 also ends counting the clock signals.

The period that the potential of the ramp signal ramp changes from time t6 to time t7 is a period of AD conversion of the amplified S signal. This AD conversion period may be referred to as an SAD period.

After that, the horizontal scan circuit 150 performs control to output the digital S+N signal and digital N signal maintained in the memory 133 in each column to the signal processing unit 190 sequentially from the memory 133 in each column.

During the SAD period, the vertical scan circuit 140 sets both of the signal PRES(m) and the signal PTX(m) to be output to the pixel 111 in the "m"th row High. During the period that the signal PRES(m) is High, when the signal PTX(m) becomes High, the charge of the photodiode 114 is reset. The operation of resetting the charge of the photodiode 114 is referred to as an electronic shutter operation. The electronic shutter operation performed on the plural of pixel rows sequentially for each row by the vertical scan circuit 140 is a shutter scan.

In the image pickup device according to the present embodiment, the cancellation of the reset of the photodiode 114 of the pixel 111 which is different from the pixel 111 to which the optical signal based on the amplified S signal which is AD-converted during the SAD period is output is set in a period, which is not a period of the SAD period, after the SAD period.

It is assumed that cancellation of resetting the photodiode 114 is set during the SAD period. As the signal PTX(m) shifts from High to Low, a change occurs in the power source of a circuit, in the vertical scan circuit 140, which generates the low-level signal PTX. Due to this change in the power source, a change occurs in low-level potential of signals PTX(m−1) of the pixels 111 in the "m−1"th row, which share the power source. Due to a coupling capacity existing between the transfer line that transfers the signal PTX(m−1) and the input node FD, the potential of the input node FD changes corresponding to the change of the potential in the transfer line. With this, the signal level of the optical signal changes. Due to the change of the signal level of the optical signal, the signal level of the amplified S signal also changes. Thus, by canceling the reset of the photodiode 114 of another pixel 111 during the SAD period, the signal level of the digital S+N signal changes.

According to the present embodiment, cancellation of the reset of the photodiode 114 of the pixel 111 which is different from the pixel 111 from which the optical signal is being read is executed in a period other than the period of the AD conversion of the signals based on the optical signal. With this, the image pickup device according to the present embodiment has an effect that can suppress the change in digital S+N signal due to the cancellation of the reset of the photodiode 114.

The operation of reading the noise signal and optical signal of the pixel 111 in the "m−1"th row is the same as that of the pixel 111 in the "m"th row. The start of a period for storing the charge of the photodiode 114 of the pixel 111 in the "m−1"th row is at the timing of time t8 when the signal PTX(m−1) becomes Low while the signal PRES(m−1) is High. Further, the end of the period of storing the charge of the photodiode 114 of the pixel 111 in the "m−1"th row is at the timing of time t14 when the signal PTX(m−1) becomes Low while the signal PRES(m−1) is Low.

Here, according to the present embodiment, the pixel 111 from which the optical signal is being read and the pixel 111 in which the reset of the photodiode 114 is canceled are placed next to each other. The present embodiment is not limited to the above example and there may be pixels 111 in a plurality of rows between the pixel 111 from which the optical signal is being read and the pixel 111 in which the reset of the photodiode 114 is canceled, according to the setting of the length of the period for storing the charge.

Here, the present embodiment has explained an example that the pixel 111 includes the selection transistor 118; however, the present embodiment is not limited to this example. As a substitute for the pixel 111 including the selection transistor 118, the selected state and non-selected state of the pixel 111 may be switched by the potential of the input node FD. For example, the power source voltage SVDD that supplies power to the reset transistor 116 can be made to be switchable between a potential for the non-selected state of the pixel 111 and a potential for the selected state of the pixel 111. For the pixel 111 from which the optical signal is read out, the potential of the power source voltage SVDD is set as the potential for the selected state. Then, the reset transistor 116 is turned on and the potential of the input node FD is set as a potential for the selected state so that the amplification transistor 117 is turned on. On the other hand, for the pixel 111 from which the optical signal is not read out, the potential of the power source voltage SVDD is set as the potential for the non-selected state. Then, the reset transistor 116 is turned on and the potential of the input node FD is set as potential for the non-selected state so that the amplification transistor 117 is turned off. With this, even when the pixel 111 does not include the selection transistor 118, the selected state or the non-selected state of the pixel 111 can be performed. In the case of the pixel 111 having the above configuration, the operation according to the present embodiment can also be applied.

Second Embodiment

An image pickup device according to the present embodiment will be described focusing on the difference from the first embodiment.

According to the first embodiment, the noise signal of the pixel 111 in the "m"th row is read after the SAD period of the pixel 111 in the "m−1"th row. According to the present embodiment, during an SAD period of the pixel 111 from which an optical signal is being read, a noise signal of another pixel 111 is read. Then, a cancellation of a reset of the photodiode 114 is performed after the capacitive element SH maintains an amplified S signal, which is in a period other than the period that the capacitive element SH samples the amplified S signal.

The configuration of the image pickup device according to the present embodiment is the same as the configuration of the image pickup device according to the first embodiment.

Figure 5:
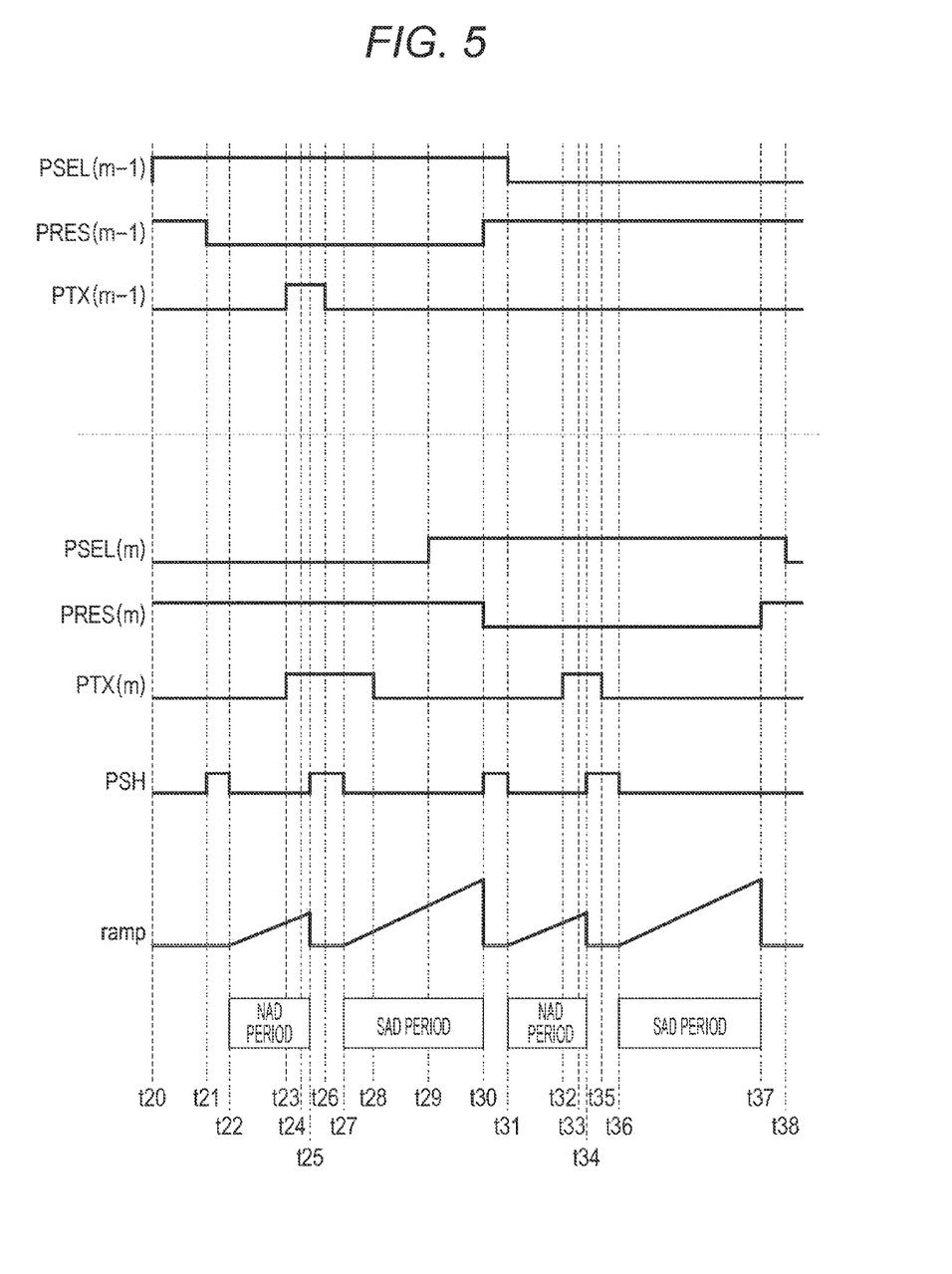
FIG. 5 is a diagram illustrating an example of an operation of the image pickup device.

FIG. 5 is a timing diagram illustrating an operation of the image pickup device according to the present embodiment. The parts different from FIG. 4 will be mainly described.

In the operation illustrated in FIG. 4, the signal PSH is kept High. According to the present embodiment, the signal PSH shifts from Low, High, and then Low prior to the NAD period and SAD period respectively.

At time t21, the operation amplifier 121 outputs an offset signal. At time t22, the timing control unit 195 sets the signal PSH High. With this, the capacitive element SH samples the offset signal. Then, at time t22, the timing control unit 195 sets the signal PSH Low. With this, the capacitive element SH maintains an offset signal.

At time t22, the ramp signal supply unit 170 starts to change the potential of the ramp signal ramp according to the elapse of time. Further, the counter 180 starts to count clock signals. With this, the signal value of the count signal output from the counter 180 increases according to the elapse of time. The offset signal output to the comparator 132 in this NAD period is a signal maintained by the capacitive element SH. When the magnitude relationship between the potentials of the offset signal and ramp signal ramp changes, the signal level of the comparison result signal output from the comparator 132 changes. The memory 133 maintains the count signal at a timing when the signal level of the comparison result signal changes, as a digital N signal.

Further, at time t23 during the NAD period, the vertical scan circuit 140 sets the signal PTX(m−1) High.

After that, at time t26, the vertical scan circuit 140 sets the signal PTX(m−1) Low. With this, the amplification transistor 117 of the pixel 111 in the "m−1"th row outputs an optical signal to the vertical output line 113 via the selection transistor 118.

At time t24, the timing control unit 195 sets the signal PSH High.

In the period from time t26 to time t27, the capacitive element SH samples the amplified S signal. Then, at time t27, the timing control unit 195 sets the signal PSH Low. With this, the capacitive element SH maintains the amplified S signal.

At time t27, the ramp signal supply unit 170 starts to change the potential of the ramp signal ramp according to the elapse of time. Further, the counter 180 starts to count the clock signals. With this, the signal value of the count signal output from the counter 180 increases according to the elapse of time. When the magnitude relationship between the potentials of the amplified S signal and ramp signal ramp changes, the signal level of the comparison result signal output from the comparator 132 changes. The memory 133 maintains the count signal at the timing when the signal level of the comparison result signal changes, as a digital S+N signal.

In the SAD period from time t27 to time t30, the vertical scan circuit 140 reads out the noise signal of the pixel 111 in the "m"th row to the vertical output line 113. At time t29, the vertical scan circuit 140 sets the signal PSEL(m) output to the pixel 111 in the "m"th row High. Further, at time t30 during the SAD period, the vertical scan circuit 140 sets the signal PRES(m) Low. With this, to the vertical output line 113, the noise signal is output from the amplification transistor 117 of the pixel 111 in the "m"th row.

The vertical scan circuit 140 sets the signal PTX(m) output to the pixel 111 which is different from the pixel 111 from which the optical signal is being read to be High at time t23. Since the signal PRES(m) is also set to be High, the charge of the photodiode 114 of the pixel 111 in the "m"th row is reset.

Then, at time t28, the vertical scan circuit 140 sets the signal PTX(m) output to the pixel 111 which is different from the pixel 111 from which the optical signal is being read to be Low. With this, at time t28, the reset of the photodiode 114 of the pixel 111 in the "m"th row is canceled.

The image pickup device according to the present embodiment sets the cancellation of the reset of the photodiode 114 of the pixel 111 which is different from the pixel 111 corresponding to the amplified S signal, which is AD-converted in the SAD period, in a period other than the period in which the capacitive element SH samples the amplified S signal. In an example of the present embodiment, the cancellation of the reset of the photodiode 114 is set at the timing after the capacitive element SH maintains the amplified S signal.

It is assumed that the cancellation of the reset of the photodiode 114 is set during the period that the capacitive element SH samples the amplified S signal. As described in the first embodiment, since the signal PTX(m) changes from High to Low, the potential of the input node FD of the pixel 111 from which the optical signal is being read changes. With this, the signal level of the optical signal changes. According to the change of the signal level of the optical signal, the signal level of the amplified S signal also changes. This changed amplified S signal is to be maintained in the capacitive element SH. Thus, in the period that the capacitive element SH samples the amplified S signals, due to the cancellation of the reset of the photodiode 114 of the different pixel 111, the signal level of the digital S+N signal changes.

According to the present embodiment, cancellation of the reset of the photodiode 114 of the pixel 111 which is different from the pixel 111 from which the optical signal is being read is performed in a period other than the period that the capacitive element SH samples the amplified S signal. With this, the image pickup device of the present embodiment has an effect that the changes of the digital S+N signal due to the cancellation of the reset of the photodiode 114 can be suppressed.

Third Embodiment

An image pickup device according to the present embodiment will be described focusing on a part different from the first embodiment.

Figure 1:
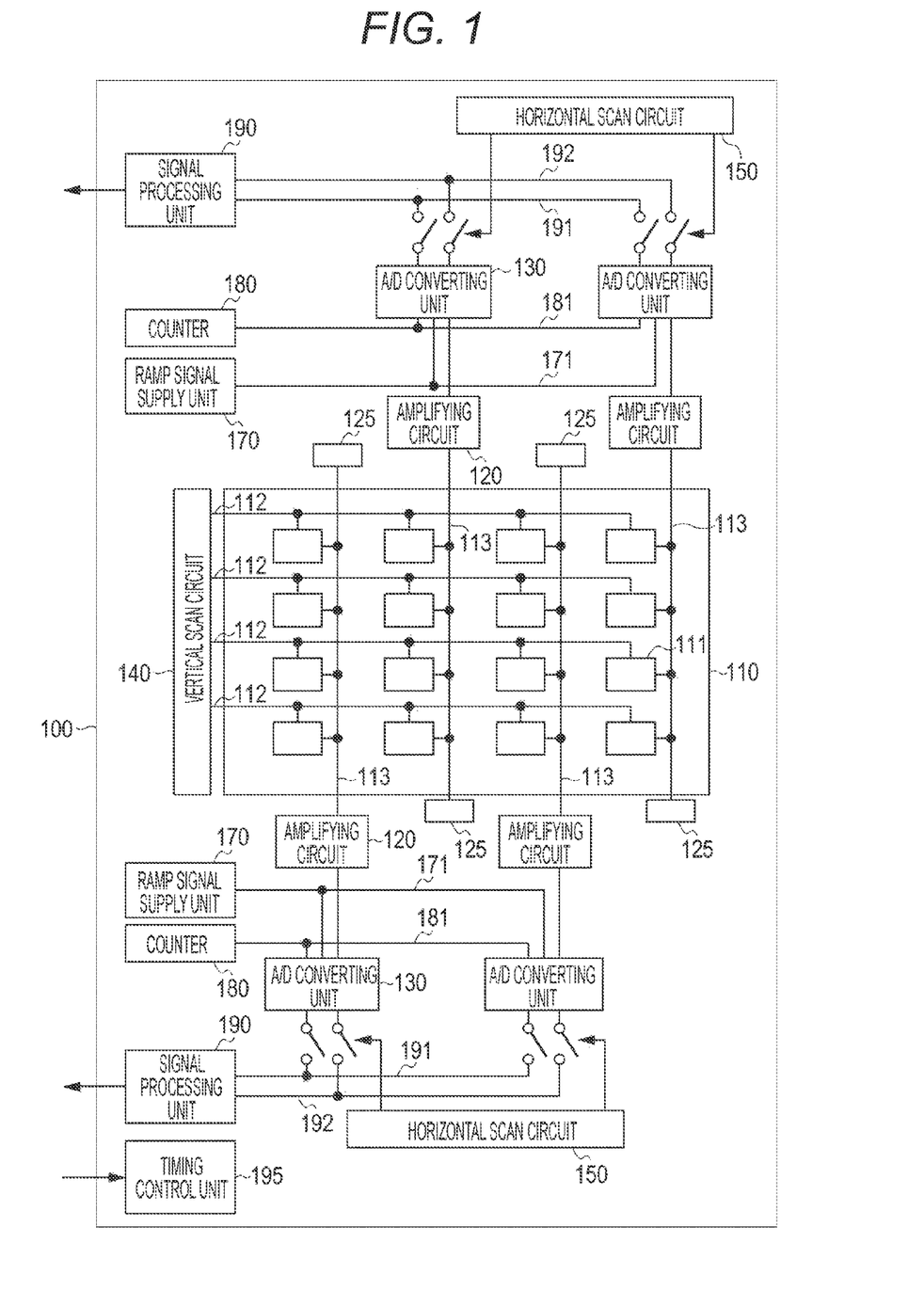
FIG. 1 is a diagram illustrating an example of a configuration of an image pickup device.
Figure 6:
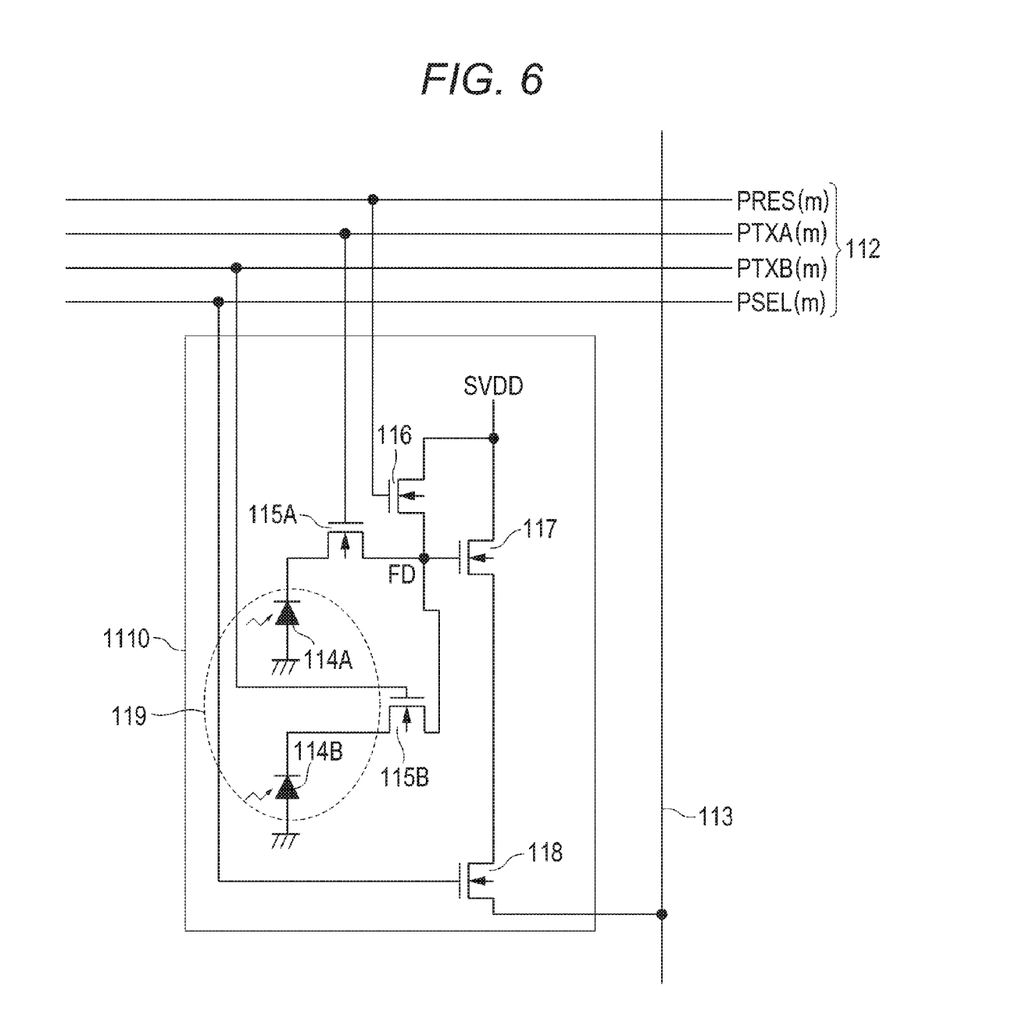
FIG. 6 is a diagram illustrating an example of a configuration of a pixel.

The image pickup device according to the present embodiment includes a pixel 1110 illustrated in FIG. 6 as a substitute for the pixel 111 illustrated in FIG. 1.

The pixel 1110 of FIG. 6 includes a couple of photodiodes 114A and 114B that perform photoelectric conversion respectively. Further, the pixel 1110 includes transfer transistors 115A and 115B. The input node FD is connected to the photodiode 114A via the transfer transistor 115A. Further, the input node FD is connected to the photodiode 114B via the transfer transistor 115B.

Further, the pixel 1110 further includes a micro lens 119. The photodiode 114A and photodiode 114B share the single micro lens 119. The light transmitted through the single micro lens 119 enters the photodiode 114A and photodiode 114B.

The gate electrode of the transfer transistor 115A is connected to the transfer line that transfers the signal PTXA(m), among the pixel control lines 112. Further, the gate electrode of the transfer transistor 115B is connected to the transfer line that transfers the signal PTXB(m), among the pixel control lines 112.

In the pixel 1110 of FIG. 6, the two photodiodes 114A and 114B share the single amplification transistor 117, single reset transistor 116, and single selection transistor 118. With this, the number of transistors provided to one photodiode can be reduced.

The configuration of other parts of the image pickup device according to the present embodiment is the same as the configuration of the image pickup device according to the first embodiment.

Figure 7:
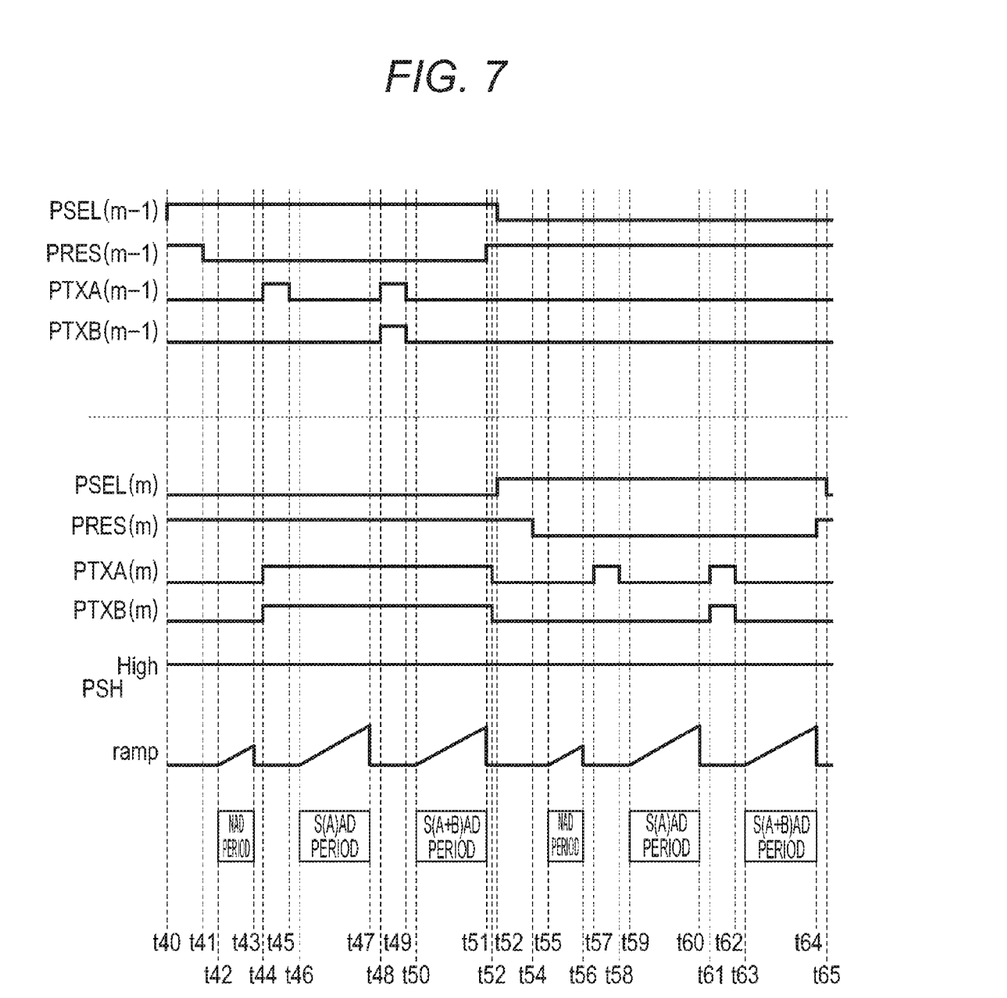
FIG. 7 is a diagram illustrating an example of an operation of the image pickup device.

FIG. 7 is a timing diagram illustrating an operation of the image pickup device according to the present embodiment.

The operations from time t40 to time t43 are the same as the operations from time t0 to time t3 of FIG. 4 in the first embodiment.

At time t44, the vertical scan circuit 140 sets the signal PTXA(m−1) High. With this, a charge generated by the photodiode 114A of the pixel 1110 in the "m−1"th row is transferred to the input node FD. At time t45, the vertical scan circuit 140 sets the signal PTXA(m−1) Low. With this, the transfer of the charge generated by the photodiode 114A of the pixel 1110 in the "m−1"th row to the input node FD ends. With this, the amplification transistor 117 of the pixel 1110 in the "m−1"th row outputs a signal based on the charge generated by the photodiode 114A to the vertical output line 113 via the selection transistor 118. This signal is expressed as a pixel A signal. The pixel A signal is one of the optical signals output from the pixel 1110. Another of the optical signals is a later described pixel A+B signal.

To the operation amplifier 121, a signal, in which the noise signal that the capacitive element C0 clamps is subtracted from the pixel A signal, is input. This signal is expressed as an A signal.

The operation amplifier 121 outputs a signal, in which the A signal is amplified, to the comparator 132. This signal is expressed as an amplified A signal.

In the period from time t46 to time t47, the amplified A signal is AD-converted. This period is referred to as an S(A)AD period. The digital signal, which is maintained by the memory 133 by AD conversion, corresponding to the amplified A signal is referred to as a digital A+N signal.

At time t48, the vertical scan circuit 140 sets the signal PTXA(m−1) and signal PTXB(m−1) High, respectively. With this, the charges respectively generated in the photodiode 114A and photodiode 114B are transferred to the input node FD.

At time t49, the vertical scan circuit 140 sets the signal PTXA(m−1) and signal PTXB(m−1) Low, respectively. With this, the transfer of the charges respectively generated in the photodiode 114A and photodiode 114B to the input node FD ends. In the input node FD, the charge generated by the photodiode 114A during a period from time t46 to time t49 and the charge generated by the photodiode 114B are added to the charge of the photodiode 114A which has been already transferred at time t45. With this, the amplification transistor 117 of the pixel 1110 in the "m−1"th row outputs a signal based on the charges generated by the photodiode 114A and photodiode 114B to the vertical output line 113 via the selection transistor 118. This signal is referred to as a pixel A+B signal. The pixel A+B signal is one of the optical signals output from the pixel 1110 as described above.

To the operation amplifier 121, a signal in which a noise signal that the capacitive element C0 clamps is subtracted from the pixel A+B signal is input. This signal is referred to as an A+B signal.

The operation amplifier 121 outputs an amplified signal of the A+B signal to the comparator 132. This signal is referred to as an amplified A+B signal.

In a period from time t50 to time t51, the amplified A+B signal is AD-converted. This period is referred to as an S(A+B)AD period. The digital signal, which is maintained by the memory 133 by the AD conversion, corresponding to the amplified A+B signal is referred to as a digital A+B+N signal.

After that, the horizontal scan circuit 150 sequentially outputs the digital A+N signal, digital A+B+N signal, and digital N signal maintained in the memories 133 in each column to the signal processing unit 190 from the memories 133 in each column.

The signal processing unit 190 outputs a signal in which a digital N signal is subtracted from the digital A+N signal to the outside of the image pickup device. This signal is referred to as a digital A signal. Further, the signal processing unit 190 outputs a signal in which a digital N signal is subtracted from the digital A+B+N signal to the outside of the image pickup device. This signal is referred to as a digital A+B signal. Outside the image pickup device, a process for subtracting a digital A signal from a digital A+B signal and obtaining a digital B signal is performed. With the digital A signal and digital B signal, a focus detecting operation of a phase difference detecting method is performed. Further, outside the image pickup device, an image is generated from the digital A+B signal.

The vertical scan circuit 140 performs a cancellation of the resets of the photodiode 114A and photodiode 114B of the pixel 1110 in the "m"th row at time t52 after the S(A+B)AD period.

In the S(A+B)AD period, when a cancellation of the resets of the photodiode 114A and photodiode 114B of the pixel 1110 in the "m"th row is performed, a change occurs in the amplified A+B signal by the mechanism described in the first embodiment. Accordingly, a change occurs in the digital A+B+N signal.

On the other hand, according to the present embodiment, the cancellation of the resets of the photodiodes 114A and 114B of the pixel 1110 different from the pixel 1110 that is performing AD conversion is performed in a period other than the S(A+B)AD period. With this, the change of the digital A+B+N signal due to the cancellation of the resets of the photodiodes 114A and 114B can be suppressed.

Here, according to the present embodiment, the vertical scan circuit 140 performs a cancellation of the resets of the photodiode 114A and photodiode 114B of the pixel 1110 in the "m"th row is performed at time t52 after the S(A+B)AD period. This example does not set any limitation as long as the cancellation of the resets of the photodiode 114A and photodiode 114B in the pixel 1110 in the "m"th row is performed in a period other than the S(A+B)AD period.

Further, the vertical scan circuit 140 may perform cancellation of the resets of the photodiode 114A and photodiode 114B of the pixel 1110 in the "m"th row in a period from time t47 to time t50, which is a period other than the S(A)AD period. In this case, changes in the digital A+N signal due to the cancellation of the resets of the photodiodes 114A and 114B can be suppressed.

According to a preferable example of the embodiment, the cancellation of the resets of the photodiode 114A and photodiode 114B is performed in a period other than the S(A) period and S(A+B) period. With this, a change in the signals of both digital A+N signal and digital A+B+N signal due to the cancellation of the resets of the photodiodes 114A and 114B can be suppressed.

On the other hand, there may be a case that it is difficult to perform a cancellation of the resets of the photodiode 114A and photodiode 114B in a period other than the S(A) period and S(A+B) period, depending on the length of the charge accumulating period. In such a case, it is preferable that the cancellation of the resets of the photodiode 114A and photodiode 114B is performed avoiding the S(A+B) period rather than the S(A) period. This is because that the signals are used in different purposes, which means that the digital A+B signal is used to generated an image while the digital A signal is used to detect a focus. An allowable range of the accuracy of the signals used to detect a focus is wider than an allowable range of the accuracy of the signals used for the images. Thus, changes in the signals caused by a cancellation of the resets of the photodiodes 114A and 114B are easily allowed in the digital A+N signals compared to the digital A+B+N signal. Thus, the cancellation of the resets of the photodiodes 114A and 114B may be performed in the S(A)AD period, which is a period other than the S(A+B)AD period, depending on the setting of the length of the charge accumulating period.

Further, the cancellation of the resets of the photodiode 114A and photodiode 114B may be performed at the same timing when the transfer of the charge from the photodiode 114A of the pixel 111 corresponding to the amplified A+B signal being AD-converted to the input node FD is ended. In other words, at time t45 in the timing diagram of FIG. 7, the signal PTXA(m) and signal PTXB(m) may be switched from High to Low.

Further, the cancellation of the resets of the photodiode 114A and photodiode 114B may be performed at the timing when the transfer of the charge from the photodiode 114B of the pixel 111 corresponding to the amplified A+B signal being AD converted to the input node FD is ended. In other words, at time t49 in the timing diagram of FIG. 7, the signal PTXA(m) and signal PTXB(m) may be switched from High to Low.

Here, it is preferable that the signal PTXA(m) and signal PTXB(m) are switched from High to Low at time t45, rather than time t49. Compared to time t49, when the signal PTXA(m) and signal PTXB(m) are switched from High to Low at time t45, the change is less likely to occur in the amplified A+B signals. Accordingly, compared to time t49, when the signal PTXA(m) and signal PTXB(m) are switched from High to Low at time t45, the change in the digital A+B+N signal is reduced. With this, compared to the digital A+N signal, the change in the digital A+B+N signal that does not easily allow the change in signal can be reduced.

Further, according to the present embodiment, the signal PSH is kept High. The operations of the present embodiment and the second embodiment may be combined and, specifically, operation of FIG. 8 may be executed.

Figure 8:
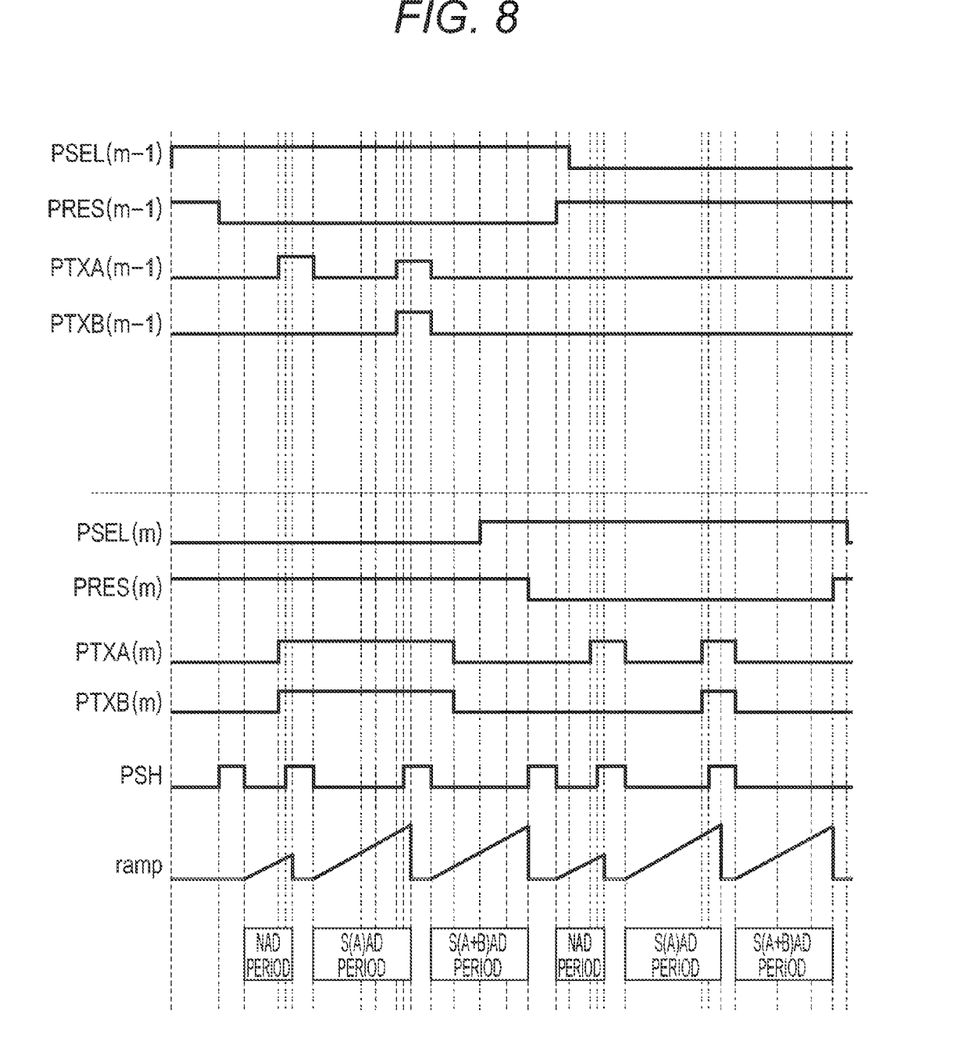
FIG. 8 is a diagram illustrating an example of an operation of the image pickup device.

In the operation, the cancellation of the resets of the photodiodes 114A and 114B in the "m"th row is performed at a timing after the capacitive element SH maintains the amplified A+B signal, which is a period other than the period that the capacitive element SH samples the amplified A+B signals. With this, as described in the present embodiment, changes in the digital A+B+N signal due to cancellation of the resets of the photodiodes 114A and 114B in the "m"th row can be suppressed. Also in this example, the cancellation of the resets of the photodiodes 114A and 114B in the "m"th row may be performed after the capacitive element SH maintains the amplified A signal. Further, the cancellation of the resets of the photodiodes 114A and 114B in the "m"th row may be performed in a period other than the period that the capacitive element SH samples the amplified A+B signal, that is, in the period that the capacitive element SH samples amplified A signal.

In the operation in FIG. 8, the cancellation of the resets of the photodiode 114A and photodiode 114B may be performed at the same timing when the transfer of the charge from the photodiode 114A of the pixel 111 corresponding to the amplified A+B signal being AD-converted to the input node FD is ended.

In the operation in FIG. 8, the cancellation of the resets of the photodiode 114A and photodiode 114B may be performed at the same timing when the transfer of the charge from the photodiode 114B of the pixel 111 corresponding to the amplified A+B signal being AD-converted to the input node FD is ended.

Fourth Embodiment

The present embodiment relates to an image pickup system including the image pickup device according to the above described embodiments.

Figure 9:
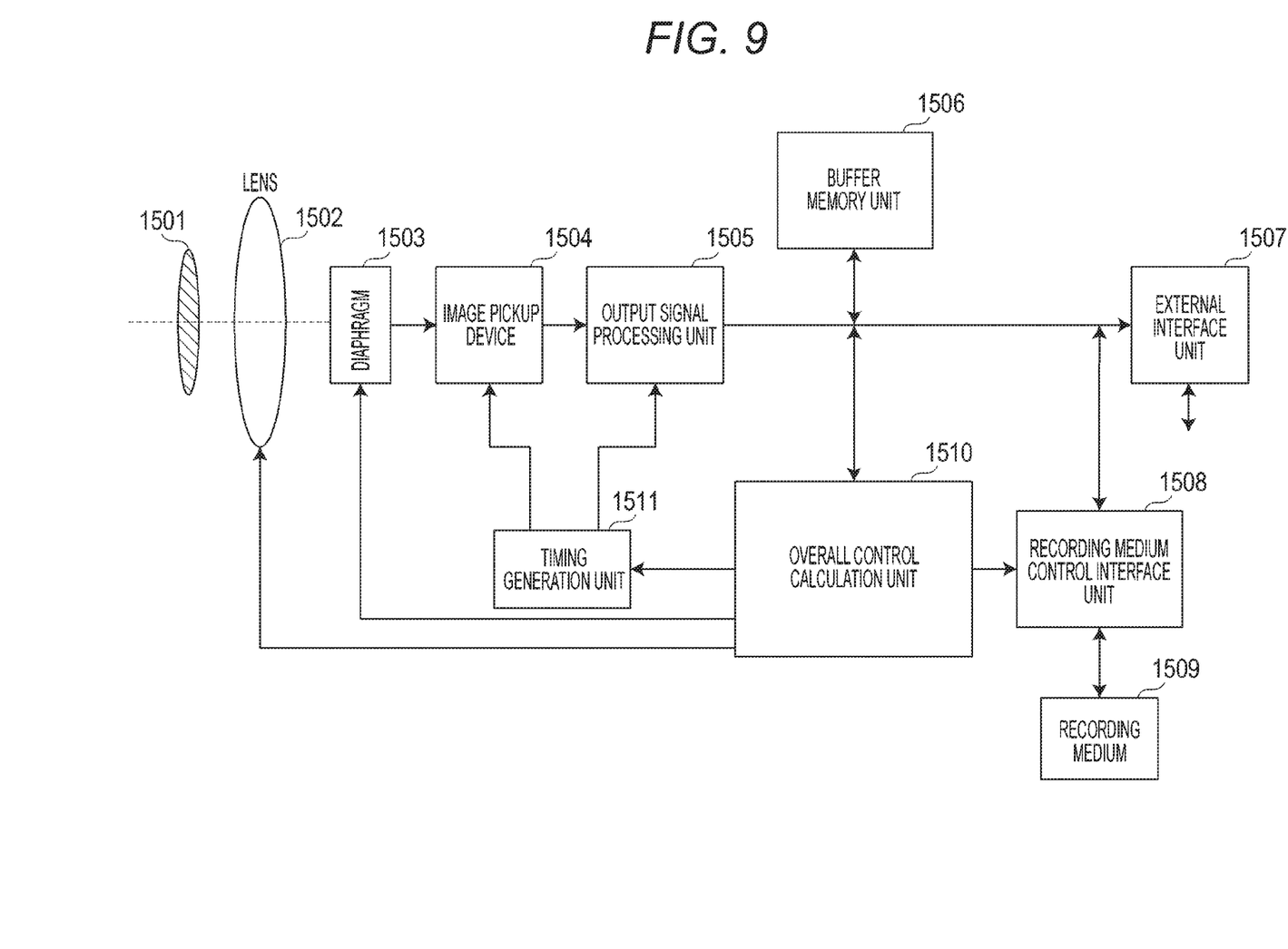
FIG. 9 is a diagram illustrating an example of a configuration the image pickup system.

As the image pickup system, there may be a digital still camera, a digital camcorder, a monitoring camera, and the like. FIG. 9 illustrates a schematic view in a case that the image pickup device is applied to a digital still camera as an example of the image pickup system.

The image pickup system illustrated in FIG. 9 includes a barrier 1501 for protecting a lens, a lens 1502 for forming an optical image of an object on an image pickup device 1504, and a diaphragm 1503 for making an amount of light transferring through the lens 1502 variable. The lens 1502 and diaphragm 1503 serve as an optical system for collecting light to the image pickup device 1504. Further, the image pickup system exemplified in FIG. 9 includes an output signal processing unit 1505 for performing a process of an output signal output from the image pickup device 1504. The output signal processing unit 1505 performs an operation for performing various correction and compression according to need and outputting the signal.

The image pickup system exemplified in FIG. 9 further includes a buffer memory unit 1506 for temporarily storing image data and an external interface unit 1507 for communicating with an external computer or the like. Further, the image pickup system includes a detachable recording medium 1509 such as a semiconductor memory for recording or reading image pickup data and a recording medium control interface unit 1508 for recording and reading to the recording medium 1509. Further, the image pickup system includes an overall control calculation unit 1510 for controlling various calculations and the entire digital still camera and a timing supply unit 1511 for outputting various timing signals to the image pickup device 1504 and output signal processing unit 1505. Here, the timing signal or the like may be input from outside and the image pickup system needs to include at least the image pickup device 1504 and the output signal processing unit 1505 for processing the output signal output from the image pickup device 1504.

Further, as described in the third embodiment, the output signal processing unit 1505 may perform the focus detecting operation using the digital A signal and digital B signal. Further, the output signal processing unit 1505 may generate an image using the digital A+B signal. Further, the output signal processing unit 1505 may perform a focus detecting operation and an image generation.

As described above, in the image pickup system according to the present embodiment, the image pickup device 1504 can be applied and an image pickup operation can be performed.

Here, all of the above embodiments exemplify concrete examples to implement the disclosure and the technical scope of the disclosure should not be limitedly understood based on the embodiments. In other words, the disclosure can be implemented in various manners within the technological thought and its main characteristics. Further, the disclosure may be implemented with various combinations of the above described embodiments.

With the disclosed embodiments, changes caused by cancellation of a reset of a photodiode in one row can be reduced in signals being read from a pixel in another row.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-242314, filed Dec. 11, 2015, which is hereby incorporated by reference herein in its entirety.

What is claimed is:

1. A driving method of an image pickup device that comprises
   a plurality of pixels configured to be arranged in plural rows and plural columns, respectively include a photoelectric convertor for generating charge, and respectively output an optical signal based on the charge, and
   a plurality of A/D converting units configured to be respectively provided corresponding to the plural columns and convert the optical signal to a digital signal,
   the driving method comprising:
   resetting the photoelectric convertor of the pixel in a second row, which is different from a first row, among the plural rows during a period in which the pixel in the first row among the plural rows is being selected as a pixel to output the optical signal; and
   canceling the reset of the photoelectric convertor of the pixel in the second row in a period other than the period in which the A/D converting unit converts the optical signal of the pixel in the first row into the digital signal.

2. The driving method of the image pickup device, according to claim 1, wherein
   the A/D converting unit further includes a sample-and-hold circuit for sampling the optical signal and maintaining the optical signals;
   the A/D converting unit converts the optical signal maintained in the sample-and-hold circuit into the digital signal, and
   a period other than the period in which the A/D converting unit converts the optical signal of the pixel in the first row into the digital signal is a period other than the period in which the sample-and-hold circuit samples the optical signal of the pixel in the first row.

3. The driving method of the image pickup device, according to claim 1, wherein
   each of the plurality of pixels includes: a single micro lens; a first photoelectric convertor and a second photoelectric convertor for respectively generating charge using a light transmitted through the single micro lens; an input node to which the charge from the plurality of photoelectric convertors is transferred; and an amplification transistor for outputting, as the optical signals respectively, a first optical signal based on the charge of the first photoelectric convertor and a second optical signal based on the charge in which the charge of the first photoelectric convertor and the charge of the second photoelectric convertor are added,
   the A/D converting unit sequentially converts the first optical signal and second optical signal of the pixel in the first row into digital signals, and
   the reset of the photoelectric convertor of the pixel in the second row is canceled in a period other than the period in which the A/D converting unit converts the second optical signal of the pixel in the first row into the digital signal.

4. The driving method of the image pickup device, according to claim 2, wherein each of the plurality of pixels includes: a single micro lens; a first photoelectric convertor and a second photoelectric convertor for respectively generating charge using a light transmitted through the single micro lens; an input node to which the charge from the plurality of photoelectric convertors is transferred; and an amplification transistor for outputting, as the optical signals respectively, a first optical signal based on the charge of the first photoelectric convertor and a second optical signal based on the charge in which the charge of the first photoelectric convertor and the charge of the second photoelectric convertor are added, the A/D converting unit sequentially converts the first optical signal and second optical signal of the pixel in the first row into digital signals, and the reset of the photoelectric convertor of the pixel in the second row is canceled in a period other than the period in which the A/D converting unit converts the second optical signal of the pixel in the first row into the digital signal.

5. The driving method of the image pickup device, according to claim 3, wherein the reset of the photoelectric convertor of the pixel in the second row is canceled in a period other than the period in which the A/D converting unit converts the second optical signal of the pixel in the first row into the digital signal or the period in which the A/D converting unit converts the first optical signal of the pixel in the first row into the digital signal.

6. The driving method of the image pickup device, according to claim 3, wherein the reset of the photoelectric convertor of the pixel in the second row is canceled in a period other than the period in which the A/D converting unit converts the second optical signal of the pixel in the first row into the digital signal, and in a period in which the A/D converting unit converts the first optical signal of the pixel in the first row into the digital signal.

7. The driving method of the image pickup device, according to claim 3, wherein the reset of the photoelectric convertor of the pixel in the second row is canceled in a period other than the period in which the A/D converting unit converts the second optical signal of the pixel in the first row into the digital signal at a timing to end a transfer of the charge from the first photoelectric convertor to the input node in the first row.

8. The driving method of the image pickup device, according to claim 5, wherein the reset of the photoelectric convertor of the pixel in the second row is canceled in a period other than the period in which the A/D converting unit converts the second optical signal of the pixel in the first row into the digital signal and at a timing to end a transfer of the charge from the first photoelectric convertor to the input node in the first row.

9. The driving method of the image pickup device, according to claim 6, wherein the reset of the photoelectric convertor of the pixel in the second row is canceled in a period other than the period in which the A/D converting unit converts the second optical signal of the pixel in the first row into the digital signal and at a timing to end a transfer of the charge from the first photoelectric convertor to the input node in the first row.

10. The driving method of the image pickup device, according to claim 1, wherein each of the plurality of pixels includes: a single micro lens; a first photoelectric convertor and a second photoelectric convertor for respectively generating charge using a light transmitted through the single micro lens; an input node to which the charge from the plurality of photoelectric convertors is transferred; and an amplification transistor for outputting, as the optical signals respectively, a first optical signal based on the charge of the first photoelectric convertor and a second optical signal based on the charge in which the charge of the first photoelectric convertor and the charge of the second photoelectric convertor are added, the A/D converting unit sequentially converts the first optical signal and second optical signal of the pixel in the first row into digital signals, the A/D converting unit further includes a sample-and-hold circuit for sampling the optical signal and maintaining the optical signal, the A/D converting unit converts the optical signal maintained in the sample-and-hold circuit into the digital signal, and the reset of the photoelectric convertor of the pixel in the second row is canceled in a period other than the period in which the A/D converting unit converts the second optical signal of the pixel in the first row into the digital signal or the period in which the sample-and-hold circuit samples the second optical signal of the pixel in the first row.

11. The driving method of the image pickup device, according to claim 10, wherein the reset of the photoelectric convertor of the pixel in the second row is canceled in a period other than the period in which the A/D converting unit converts the second optical signal of the pixel in the first row into the digital signal, the period in which the sample-and-hold circuit samples the second optical signal of the pixel in the first row, the period in which the A/D converting unit converts the first optical signal of the pixel in the first row into the digital signal, or the period in which the sample-and-hold circuit samples the first optical signal of the pixel in the first row.

12. The driving method of the image pickup device, according to claim 10, wherein the reset of the photoelectric convertor of the pixel in the second row is canceled in a period other than the period in which the A/D converting unit converts the second optical signal of the pixel in the first row into the digital signal or a period in which the sample-and-hold circuit samples the second optical signal of the pixel in the first row, and in the period in which the sample-and-hold circuit samples the first optical signal of the pixel in the first row.

13. The driving method of the image pickup device, according to claim 10, wherein the reset of the photoelectric convertor of the pixel in the second row is canceled in a period other than the period in which the A/D converting unit converts the second optical signal of the pixel in the first row into the digital signal or the period in which the sample-and-hold circuit samples the second optical signal of the pixel in the first row, and at a timing to end a transfer of the charge from the first photoelectric convertor to the input node in the first row.

14. The driving method of the image pickup device, according to claim 1, further comprising an amplifying circuit configured to output a signal which is an amplified optical signal, wherein the optical signal to be converted into the digital signal by the A/D converting unit is a signal amplified by the amplifying circuit.

15. The driving method of an image pickup device, according to claim 1, wherein the photoelectric convertor of the pixel in the second row is kept to be reset during a period between a start and an end of the A/D conversion of the optical signal of the pixel in the first row by the A/D converting unit, and the reset of the photoelectric convertor of the pixel in the second row is cancelled after the end of the A/D conversion.

16. An image pickup device comprising:
a plurality of pixels configured to be arranged in plural rows and plural columns, respectively include a photoelectric convertor for generating charge, and respectively output an optical signal based on the charge;
a plurality of A/D converting units configured to be provided corresponding to the plural rows respectively and convert the optical signal into a digital signal; and
a vertical scan circuit configured to perform a shutter scan for resetting the respective photoelectric convertors of the plurality of pixels row by row, and a read out scan for outputting the optical signals row by row from the respective plurality of pixels,
wherein the vertical scan circuit
resets the photoelectric convertor of the pixel in a second row, which is a different from a first row, among the plural rows in the shutter scan during a period in which the vertical scan circuit is selecting the pixel in the first row among the plural rows as a pixel to output the optical signal in the read out scan, and
cancels the reset of the photoelectric convertor of the pixel in the second row in a period other than a period in which the A/D converting unit is converting the optical signal of the pixel in the first row into the digital signal.

17. The image pickup device according to claim 16, wherein the photoelectric convertor of the pixel in the second row is kept to be reset during a period between a start and an end of the A/D conversion of the optical signal of the pixel in the first row by the A/D converting unit, and the reset of the photoelectric convertor of the pixel in the second row is cancelled after the end of the A/D conversion.

18. An image pickup system that comprises an image pickup device and a signal processing unit for generating an image by processing a signal output from the image pickup device,
the image pickup device including:
a plurality of pixels configured to be arranged in plural rows and plural columns, respectively include a photoelectric convertor for generating charge, and respectively output an optical signal based on the charge;
a plurality of A/D converting units configured to be provided corresponding to the plural rows respectively and convert the optical signal into a digital signal; and
a vertical scan circuit configured to perform a shutter scan for resetting the respective photoelectric convertors of the plurality of pixels row by row, and a read out scan for outputting the optical signals row by row from the respective plurality of pixels,
wherein the vertical scan circuit
resets the photoelectric convertor of the pixel in a second row, which is a different from a first row, among the plural rows in the shutter scan during a period in which the vertical scan circuit is selecting the pixel in the first row among the plural rows as a pixel to output the optical signal in the read out scan, and
cancels the reset of the photoelectric convertor of the pixel in the second row in a period other than a period in which the A/D converting unit is converting the optical signal of the pixel in the first row into the digital signal.

* * * * *